United States Patent [19]

Bellini

[11] 4,150,611
[45] Apr. 24, 1979

[54] CONTINUOUS CYCLE DESTONING AND HALVING MACHINE, PARTICULARLY FOR PEACHES, APPLES AND SIMILAR FRUIT

[75] Inventor: Giorgio Bellini, Parma, Italy

[73] Assignee: Zilli & Bellini S.r.l., Parma, Italy

[21] Appl. No.: 799,979

[22] Filed: May 24, 1977

[30] Foreign Application Priority Data

Jun. 4, 1976 [IT] Italy ............................ 46865 A/76
Jan. 10, 1977 [IT] Italy ............................ 46801 A/77

[51] Int. Cl.² ............................................. A23N 3/08
[52] U.S. Cl. .................................. 99/548; 99/549; 99/553
[58] Field of Search ........................ 99/547–550, 99/552–553; 198/385–386, 377, 500, 839; 221/265–277; 83/168–169, 171

[56] References Cited

U.S. PATENT DOCUMENTS

| 1,725,223 | 8/1929 | Sturges | 99/550 |
| 1,982,779 | 12/1934 | Ayars | 99/548 |
| 2,406,311 | 8/1946 | Ashlock | 99/550 |
| 2,788,037 | 4/1957 | Carter | 99/548 |
| 2,902,143 | 9/1959 | Sundin | 198/839 |
| 3,783,991 | 1/1974 | McCahon | 198/650 |
| 3,816,875 | 6/1974 | Duncan | 83/169 |
| 3,835,765 | 9/1974 | Tomelleri | 99/553 |

FOREIGN PATENT DOCUMENTS

822765 10/1959 United Kingdom ............ 221/265

Primary Examiner—Christopher K. Moore
Attorney, Agent, or Firm—Brisebois & Kruger

[57] ABSTRACT

Continuous destoning and halving machine comprises a conveyor belt wound as an endless ring and consisting essentially of a chain to each link of which there is externally hinged a half cup, provided in a position opposing said hinging point with an idle roller sliding on a rail in order to be kept horizontal, during processing of the fruits or inclined for discharging purposes; on the horizontal part of the conveyor being provided loading station consisting of a fixed cylindrical peripheral duct there being provided inside said duct and fixed to the driven shaft of the conveyor a group of radial dividing elements each of which faces, during operation, to a single hole through which the first piece of fruit of each alignment is discharged singly on to the underlying half cup; the processing station consists of lower and upper cylindrical crowns moving rigidly with the driven ring gear and supporting cooperating vertically sliding mandrels aligned two by two.

16 Claims, 15 Drawing Figures

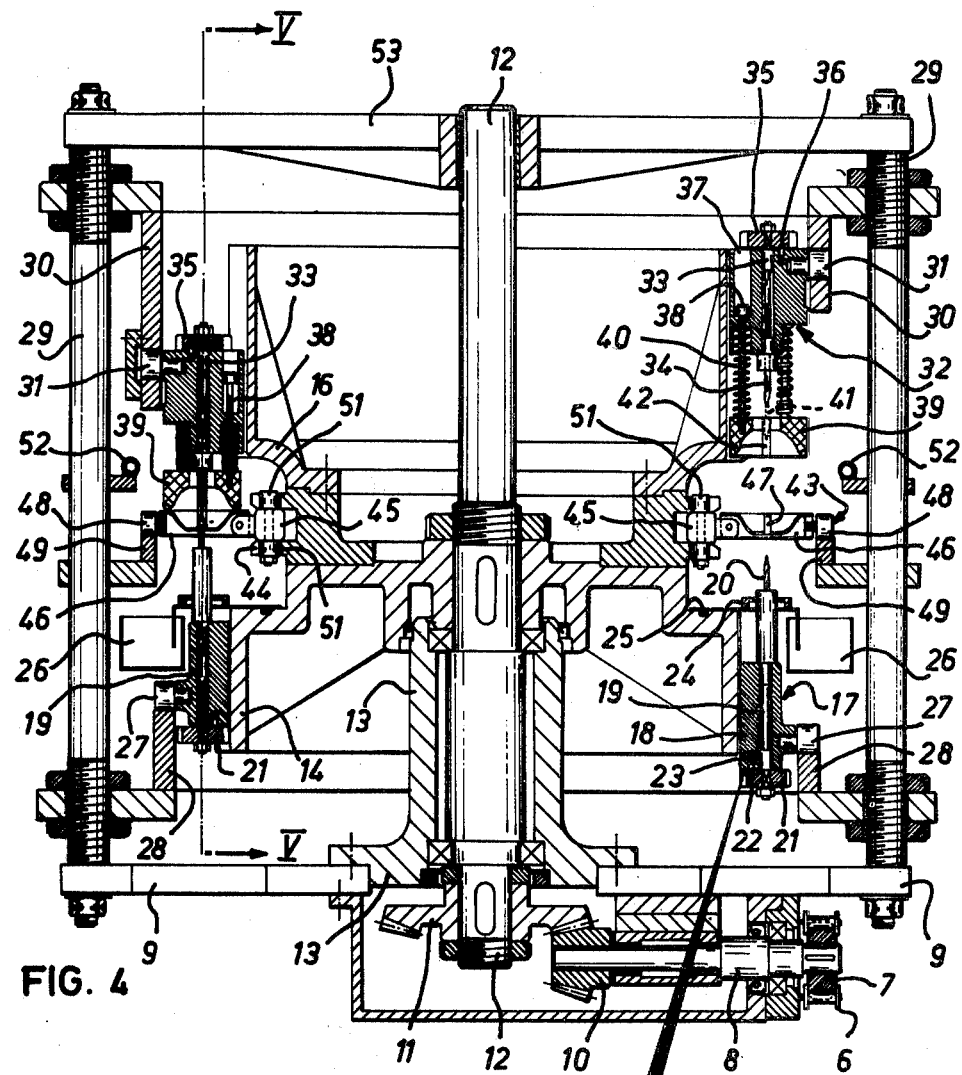
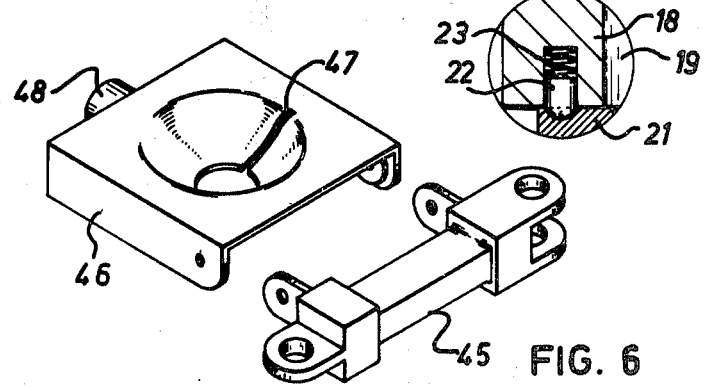
FIG. 4
FIG. 6

CONTINUOUS CYCLE DESTONING AND HALVING MACHINE, PARTICULARLY FOR PEACHES, APPLES AND SIMILAR FRUIT

SUMMARY OF THE INVENTION

This invention relates to a machine for destoning and halving peaches, apples or similar fruit, which is able to effect said operations as a continuous cycle process.

Destoning and halving machines are already known in the food preserves industry and consist essentially of a frame on which two pairs of ring gears are disposed with their axes horizontal, and about which two chains are wound to define a horizontal conveyor belt for the fruit.

Said conveyor belt is constituted by a plurality of side-by-side sectors individually connected to the two chains, and provided with two or more cavities or half cups into which the fruit are placed.

Transversely to said conveyor belt there are two platforms, a lower one and a higher one, which support both the means for blocking the fruit and the destoning knives and halving blades.

Said platforms are disposed above vertical guide cylinders so that when the conveyor belt is halted, these approach each other to cause the tools to penetrate into the fruit, these tools being withdrawn before the conveyor belt moves again.

Known machines of this type however comprise a series of disadvantages both conceptually and structurally.

In the first place, in known destoning and halving machines, the conveyor belt for the fruit to be processed is driven with intermittent motion so as to enable the tools disposed on the two platforms to operate on the fruit during halt periods.

Evidently said halt periods or down-times considerably decrease the hourly production of processed fruit so negatively influencing the production cost, the final product cost and the economical running of the firm.

Secondly, the movement of the two platforms and the tools supported by them necessitates a heavy and very complicated structure.

Lastly, in known machines the fruit are loaded on the conveyor belt upstream of the two platforms manually, using at least two operators, one on one side and one on the other side of the conveyor belt.

The object of the present invention is to provide a continuous cycle destoning and halving machine for processing pears, apples, plums or apricots in which, by means of a simple and rational construction, the aforesaid disadvantages are obviated.

According to the invention this is attained by a machine comprising a conveyor belt endlessly wound about two double ring gears of vertical axis, the belt supporting the known half cups.

Above one of said double ring gears there is a centrifugal feeder which allows a fruit to fall into each half cup, and above and below the second ring gear, which is the drive gear, there are the mandrels which support the destoning tools and halving blades.

Said mandrels are disposed at the periphery of two cylindrical crowns so that they may slide vertically relative to these latter, which rotate rigidly with said second driving ring gear.

Both the lower and upper said mandrels have their longitudinal axis vertical to substantially coincide with the vertical axis of the half cups, and the distance between the axes of two lower or upper mandrels is equal to the distance between the axes of two consecutive half cups.

Individual idle rollers branch from said upper and lower mabdrels to engage in two guides which cause the tools to penetrate into the fruit while the conveyor belt continues to run, said tools moving at the same speed as said conveyor belt.

The many production advantages of a machine so designed and working at high speed under a continuous cycle are immediately apparent.

Furthermore, the presence of an automatic fruit feed enables at least two operatives to be dispensed with, with the corresponding economical benefits deriving therefrom.

These and further advantages, together with the operational characteristics and constructional merits of the invention will be more evident from the detailed description given by way of non-limiting example hereinafter with reference to the accompanying drawings in which:

FIG. 4 is a section on the line IV—IV of FIG. 3;

FIG. 6 is a perspective exploded view of the pair of chain link and half cup elements which form the conveyor belt for the fruit;

Figure 1:
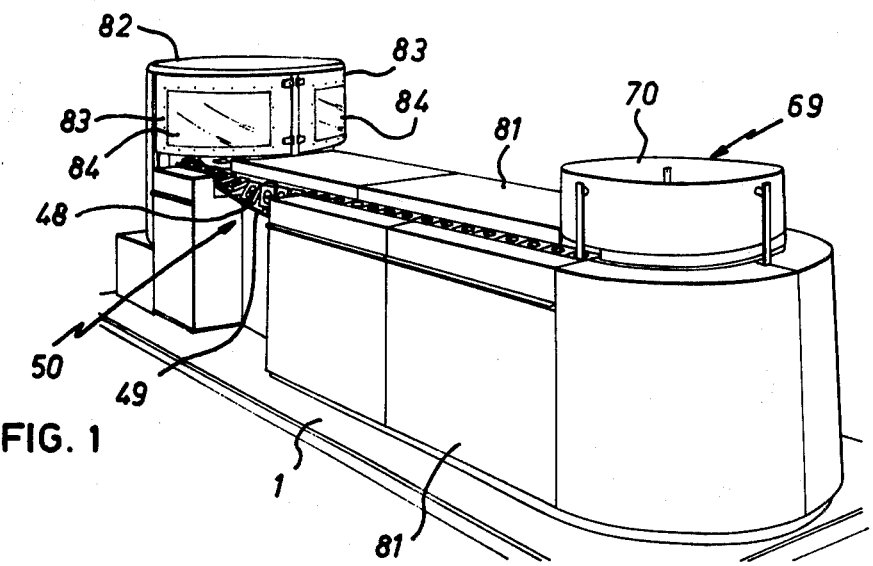
FIG. 1 is a perspective view of a machine according to the invention.

With reference to FIG. 4, the bevel gear 11 is keyed to the vertical shaft 12 which is inserted in the support 13 rigid with the frame 9, said shaft 12 being able to rotate relative to said support 13.

On the upper end of the support 13 rests the hub of the cylindrical crown 14 which is keyed to the vertical shaft 12.

To said cylindrical crown 14 there is connected a double ring gear 15 on which a second cylindrical crown 16, namely the upper crown, is fixed in a position opposing the cylindrical crown 14. On the outer cylindrical surface of the lower cylindrical crown 14 there are provided vertical prismatic guides suitably spaced apart radially, and in which the conjugate surface provided on the mandrels 17 are located to slide.

Said mandrels 17 are constituted by a member 18 provided with a through bore in which a vertical spindle 19 is inserted, the destoning tool 20 being inserted and fixed to its upper end.

The said destoning tool 20 is an usual tool normally mounted on destoning machines and comprises two reinforced blades of the same length branching from its shank, with the tips, the lateral edges and central edge of the blade, which lie in the same plane as its longitudinal axis, being provided with cutting contours.

The top of the spindle 19 is provided with a shoulder which rests against the upper horizontal face of the member 18, while the lower horizontal face of the member 18 rests against the upper face of a cross 21 keyed to the lower end of the spindle 19.

Spherical cavities are provided at each tooth on the upper face of each cross 21, to house the spherical shank of a small pin 22 inserted in a blank hole provided in the upper face of the member 18, and kept in continuous contact with the cross 21 by the compression spring 23.

On the upper end of the spindle 19 is mounted a collar 24 connected to a strip 25 substantially configured as a circular crown and rigid with the cylindrical crown 14, its outer edge being bent vertically to penetrate an underlying toroidal collection channel 26. Idle rollers 27 are disposed on the outer surface of the mandrels 17 radially to the cylindrical crown 14, and slide on a lower guide 28 which is supported by the columns 29 branching from the frame 9.

The upper end of said columns 29 supports a second guide 30 on which slide the idle rollers 31 mounted on the upper mandrels 32 which, via a prismatic coupling, slide vertically relative to the upper cylindrical crown 16.

Said upper mandrels 32 are substantially coaxial with the lower mandrels 17 and are spaced apart by a distance equal to the distance between two consecutive mandrels 17.

As in the case of the lower mandrels 17, the upper mandrels 32 are also provided with a through bore in which is inserted a spindle 33, to the lower end of which is connected a destoning tool 34 identical with the tool 20, while on its upper end there is keyed a cross 35 identical with the cross 21, its upper face being provided at each tooth with semi-spherical recesses in which is housed the end of the pin 36 which rests on an elastic support.

Three radially equidistant through bores 37 are provided in the mandrel 32 concentric to the spindle 33 and parallel thereto, and are each provided with two shoulders.

On the upper shoulder rests the head of a rod 38 which emerges from the lower face of the mandrel 32 and is screwed into a counter-cup 39 on which rests the lower end of the compression spring 40 mounted on the rod 38, its other end resting on the lower shoulder of the bore 37.

Two halving blades 41 are connected to the mandrel 32 to the sides of the curved blades of the upper destoning tool 34 and with their axes coplanar, the thickness of the halving blades being slightly greater than the thickness of said tool 34, their length being substantially double.

Said halving blades 41 penetrate into the counter-cup 39 through the slot 42, and said slot 42 and said halving blades 41 are substantially tangential to the circumference defined by the axes of the spindles 33.

Between the lower mandrels 17 and upper mandrels 32 there is a certain length of conveyor belt 43 which is wound endlessly between the two double ring gears 15 and 44, which are disposed horizontally.

Said conveyor belt 43, see FIG. 6, is essentially constituted by a chain, to each link 45 of which there is hinged a half cup 46 arranged to contain the fruit 56.

The plurality of said half cups 46 face outwards from the chain, and the distance between the axes of two consecutive half cups 46 is equal to the distance between the axes of two lower mandrels 17 or upper mandrels 32. Each half cup 46 is provided with a slot 47 parallel to the slot 42 of the overlying counter-cup 39.

On the outer vertical face of each half cup 46 there is idly mounted a roller 48 which slides on a rail 49 bent into a ring concentric with the conveyor belt 43 and supported by the machine frame 9.

Figure 2:
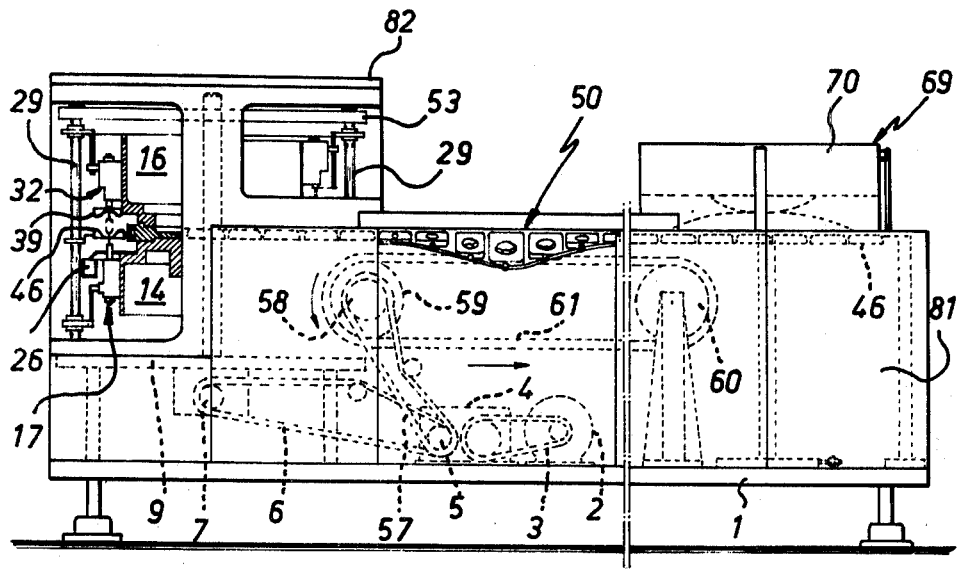
FIG. 2 is a partly sectional external lateral view of that part of the machine in which the processed fruit is discharged from the conveyor belt.
Figure 3:
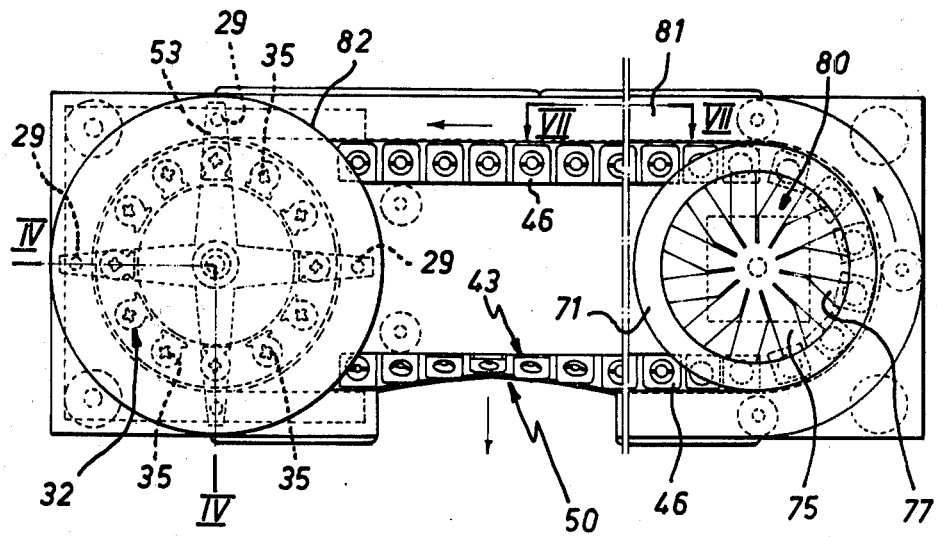
FIG. 3 is a plan view of the invention.
Figure 5:
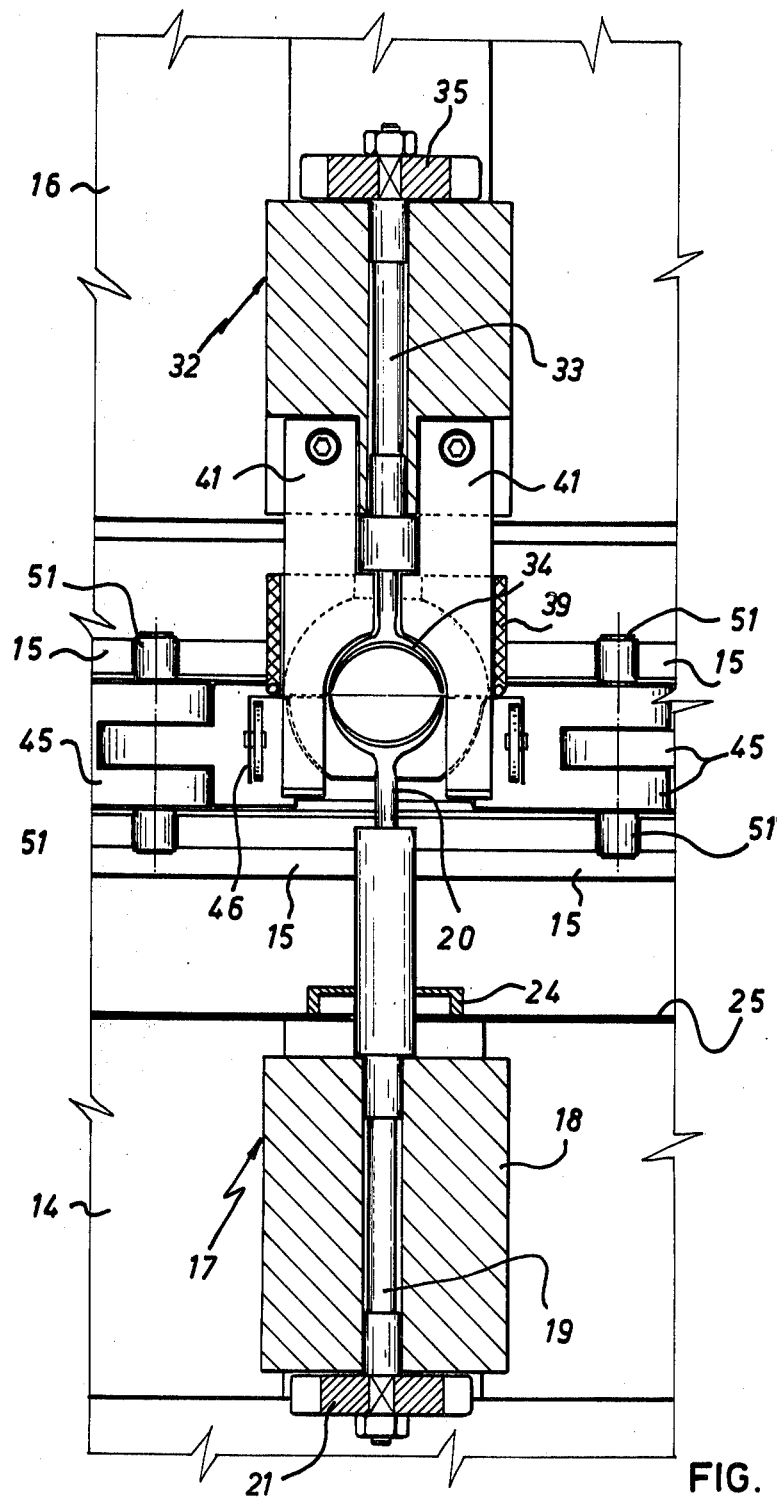
FIG. 5 is a section on the V—V of FIG. 4.

With particular reference to FIGS. 1, 2 and 3, downstream of the fruit destoning and halving station, the rail 49 descends for a certain distance and bends slightly towards the interior of the machine to form a discharge station 50 for the processed fruit, and immediately afterwards becomes horizontal again.

On the two ends of the hinging pins of two consecutive links 45 there are idly mounted two rollers 51 which mate with the two sets of toothing 44 of the double ring gears 15, while along the straight portions of the conveyor belt 43 they are guided and supported by an upper and a lower guide, not shown for clarity of drawing. With further reference to FIG. 4, at a level slightly higher than the conveyor belt 43 the columns 29 support the duct 52 bent in the form of a circumference and provided with a plurality of small through holes the axes of which substantially point towards the half cups 46.

Said columns 29 also support the frame 53 which in its centre acts as a support for the drive shaft 12.

Figure 9:
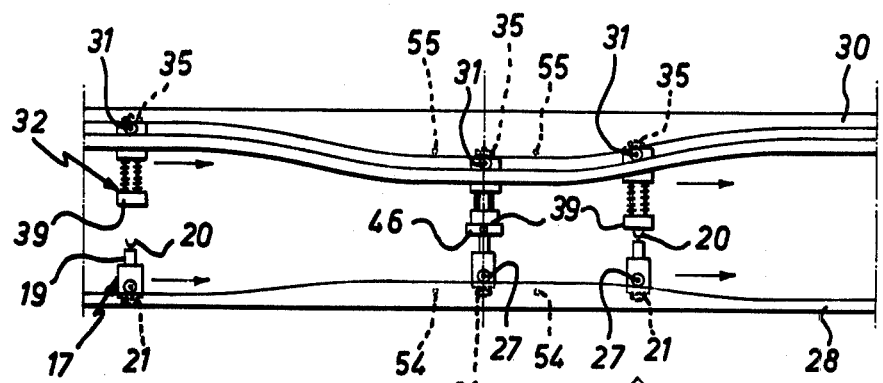
FIG. 9 is an extended plan view of the guides for the upper and lower mandrels.
Figure 10:
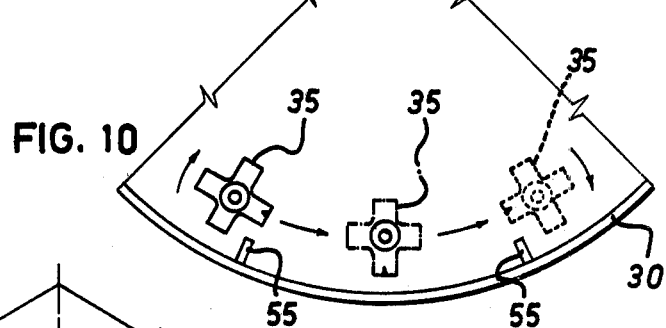
FIG. 10 is a plan view showing the successive rotations to which a cross connected to the upper destoning tools is subjected.

With particular reference to FIGS. 9 and 10, a lower pair 54 and an upper pair 55 of teeth branch from the inner surface of the lower guide 28 and upper guide 30 in positions substantially symmetrical to the longitudinal plane of symmetry of the machine, these teeth coming into contact with the lower crosses 21 and upper crosses 35 respectively.

As is evident from FIG. 9, the lower guide 28 and upper guide 30 approach each other over a certain distance in proximity to the frontal region of the destoning and halving station, the lower guide 28 becoming raised and the upper guide 30 becoming lowered.

Figure 7:
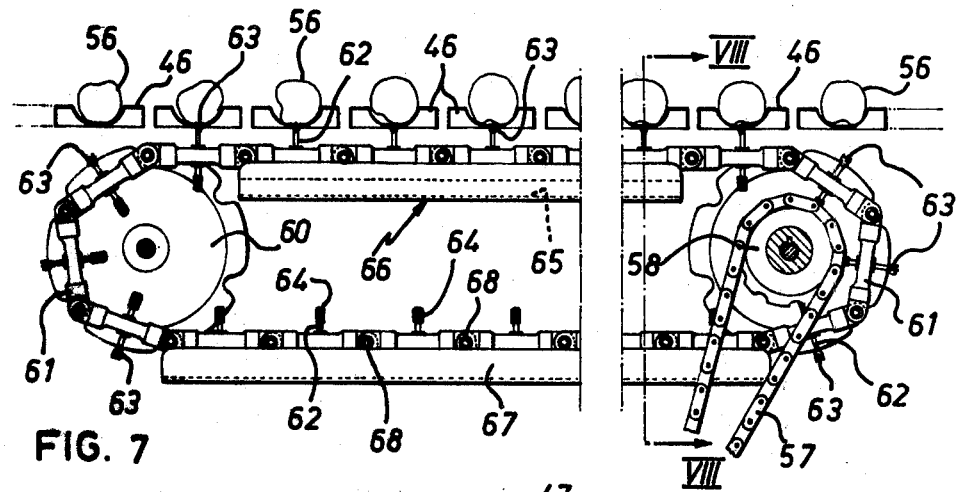
FIG. 7 is a section on the line VII—VII of FIG. 3.
Figure 8:
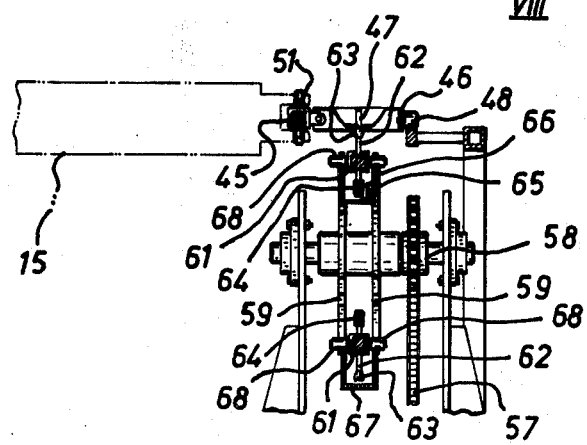
FIG. 8 is a section on the line VIII—VIII of FIG. 7.

With particular reference to FIGS. 2, 7 and 8, it will be noted that motion is derived from the most outer sprocket wheel 5 and transmitted via the chain 57 to the gear wheel 58 which drives the two adjacent ring gears 59.

A chain 61 is wound in endless ring form between the pair of ring gears 59 and a second pair of ring gears 60.

The length of said ring is substantially the same as the length of the straight portion of conveyor belt 43 disposed upstream of the destoning and halving station for the fruit 56, and the vertical plane which cuts all the links of the chain 61 in half contains all the longitudinal axes of the half cups 46 situated on said straight portion of conveyor belt 43.

A pin 62 is idly mounted substantially in the centre of each link constituting the chain 61, its end being bent outwards from the chain and provided with a small cutter 63 which penetrates slightly into the overlying half cup 46, while at its other end it is provided with a sprocket wheel 64.

Said sprocket wheel 64 engages with a horizontal rack 65 fixed in the upper guide groove 66 which is parallel to the upper straight portion of the chain 61, while in proximity to the lower straight portion of said chain 61 there is a lower guide groove 67.

The idle rollers 68 mounted at the ends of the pins connecting the links of the chain 61 slide on the edges of said upper guide groove 66 and lower guide groove 67.

Figure 12:
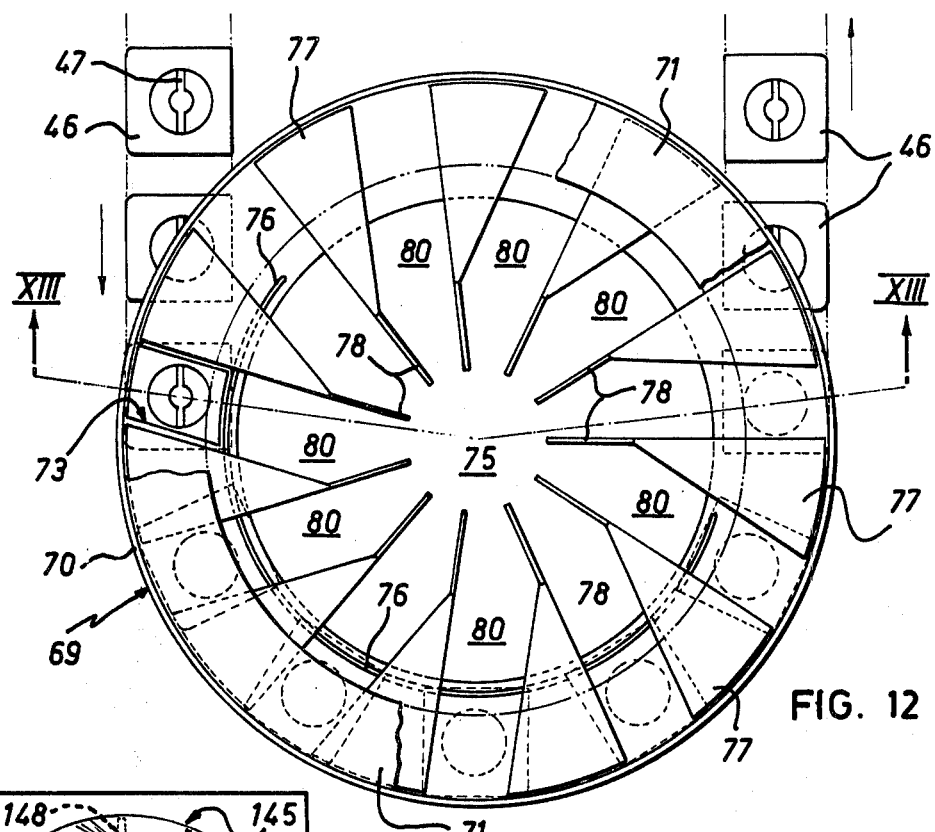
FIG. 12 is a plan view of the centrifugal feeder.
Figure 13:
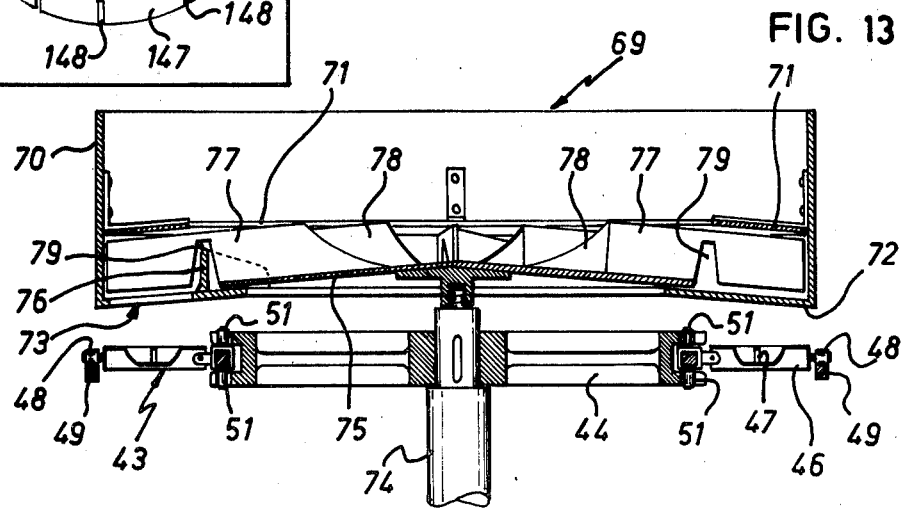
FIG. 13 is a section on the line XIII—XIII of FIG. 12.

FIGS. 12 and 13 show a centrifugal loader 69 constituted by a vertical cylindrical chamber 70 which is fixed, and to which are connected two sheet metal gussets 71 and 72 substantially in the form of a very open cone frustum with the vertex upwards.

A square hole 73 is provided in the lower gusset 72 substantially at the end of the straight portion of the conveyor belt 43 disposed upstream of the loading station 69, this hole exactly overlying said conveyor belt 43.

To the upper end of the shaft 74, on which the double ring gear 44 is keyed, there is connected a conical plate 75 with substantially equal inclination as the lower gusset 72, its peripheral edge being at a slightly higher level than the inner edge of the gusset 72. From the lower gusset 72 there branches a vertical rib 76 which increases in height from its point of commencement, which is substantially at a distance double the side of the hole 73, until it reaches the square hole 73. Said rib 76 reaches a height which is slightly less than the distance between the two gussets 71 and 72. Said rib 76 is substantially configured in plan as an arc of a circumference the length of which is approximately half a round angle, its radius being slightly less than the distance between the axis of the shaft 74 and the inner edge of the square hole 73.

Between the gussets 71 and 72 there are polyhederal boxes 77 which in plan are substantially configured as a right angled triangle with the vertex facing the centre of the conical plate 75.

Said polyhederal boxes 77 are fixed to project over the edge of said conical plate 75, and sheet metal gussets 78 branch from their vertices with a height which reduces until it disappears, as they extend towards the centre of the conical plate 75. At this centre, their ends are spaced apart by a distance substantially equal to their length.

The polyhederal boxes 77 are provided in proximity to the outer edge of the conical plate 75, with a slot 79 to prevent them interfering with the rib 76.

The polyhederal boxes 77 define a plurality of equidistant feed ducts 80 substantially radial to the conical plate 75, their terminal peripheral regions overlying the conveyor belt 43 and being spaced apart by a distance substantially equal to the distance between two consecutive half cups 46.

Finally, with reference to FIG. 1 it will be seen that the machine is completely covered by a removable external casing 81, and the destoning and halving station for the fruit 56 is provided with a lid 82 and four sides 83 provided with windows 84 of transparent plastics material.

The operation of the machine described is as follows.

With reference to FIG. 2, when the electric motor 2 is started, the reduction unit 4 rotates the shaft 12 via the chain 6 and bevel gear pair 10, 11, so that the double ring gear 15 and the cylindrical crowns 14 and 16 move rigidly with the shaft 12.

As it moves, the double ring gear 15 drives the conveyor belt 14, which in its turn rotates the double ring gear 44 and the conical plate 75 rigid with the shaft 74, on which said double ring gear 44 is keyed.

With reference to FIGS. 7 and 8, the reduction unit 4 then rotates the pair of ring gears 59 via the chain 57, and these drive the chain 61 which moves at the same speed as the overlying conveyor belt 43.

During the movement of the chain 61, the sprocket wheels 64 of the upper straight portion of said chain 61 engage in the rack 65 so that the cutters 63 rotate at high speed.

When the fruit 56 to be processed is introduced into the centrifugal loader 69, the individual pieces of fruit become aligned in the feed ducts 80, and before any of these latter reach the neighbourhood of the square hole 73, the rib 76 separates the most outer piece of fruit 56 from the other pieces of fruit 56.

When the feed channels 80 reach the neighbourhood of the square hole 73, the outer pieces of fruit 56 fall through this latter into the half cups 46 of the underlying conveyor belt 43.

When the half cups 46 leave the centrifugal loader 69 and become aligned, the rotating cutters 63 penetrate their lower part and come into contact with the fruit 56. The rotation of said cutters 63 and the small vibrations to which the chain 61 and conveyor belt 43 are subjected enable the fruit 56 to be positioned.

In this respect, the cutters 63 continually vibrate the pieces of fruit 56, which vary their position relative to the half cups 46 until the cavities in the fruit 56 to which the stalk was attached arrive above the cutters 63.

From this moment onwards, the fruit 56 is simply conveyed by the belt 43, and its position is not varied further because the cutters 63 are no longer in contact with the fruit 56.

The fruit 56 thus positioned enters the destoning and halving station, and as shown in FIGS. 4, 5, 9, 10 and 11, the half cups 46 become held between the upper mandrel 27 and lower mandrel 32 which move at the same speed as the conveyor belt 43.

At a certain point the mandrels 32 and 27 approach each other, the upper mandrel 32 slightly before the lower mandrel 17, as the roller 31 and 27 reach the proximity of the level differences of the two guides 30 and 28.

As the upper mandrel 32 is lowered, it causes the half cup 46 to come into contact with the counter-cup 39, which squeezes the fruit 56 by virtue of the compression springs 40, and almost simultaneously the halving blades 41 and upper destoning tool 34 penetrate into the fruit 56 through the slot 42.

As the lower mandrel 17 is raised, the lower destoning tool is made to penetrate into the fruit 56, and the halving blades 41 are lowered until they slightly emerge from the half cup 46 through the slot 47.

When the lower mandrel 17 and upper mandrel 32 have finished their mutual approach, the crosses 35 and 21 come into contact, during their movement, with the first of the teeth 55 and 54.

The impact of said crosses 35 and 21 against the teeth 55 and 54 causes the upper destoning tool 34 and lower destoning tool 20 to rotate so that they separate one half of the stone from the pulp of the fruit 56, said crosses 35 and 21 being compelled to make a rotation of 90° by the pins 36 and 22.

The separation of the second half of the stone from the pulp of the fruit 56 occurs when the crosses 35 and 21 collide with the second of the teeth 55 and 54.

At the end of said operations, the upper mandrel 32 and lower mandrel 17 withdraw from each other as the two guides 30 and 28 return to their level prior to the approach.

During said operations, with reference to FIG. 4, the annular region substantially at the level of the half cups 46 is fed with small jets of water from the duct 52 so that the juice and any pulp pieces removed from the fruit 56 are removed.

This wash water is conveyed into the connection channel 26 by the strip 25, and is discharged from said channel 26 into a convenient place.

The half cups 46 containing the processed fruit 56 leave the destoning and halving station aligned along the straight portion of the conveyor belt 43, and approach the discharge station 50.

In said discharge station 50, the rail 49 on which the idle rollers 48 of the half cups 46 slide turns downwards towards the centre of the machine so that the half cups 46 which were horizontal become substantially vertical by rotating relative to the links 45 of the chain defining the conveyor belt 43.

In this manner the destoned and halved fruit 56 falls into a collection hopper from which it is fed to subsequent processing.

After the discharge station 50, the rail 49 returns to a horizontal position and the half cups 46 become disposed under the centrifugal loader 69, from which point the described cycle of operations is repeated.

Figure 15:
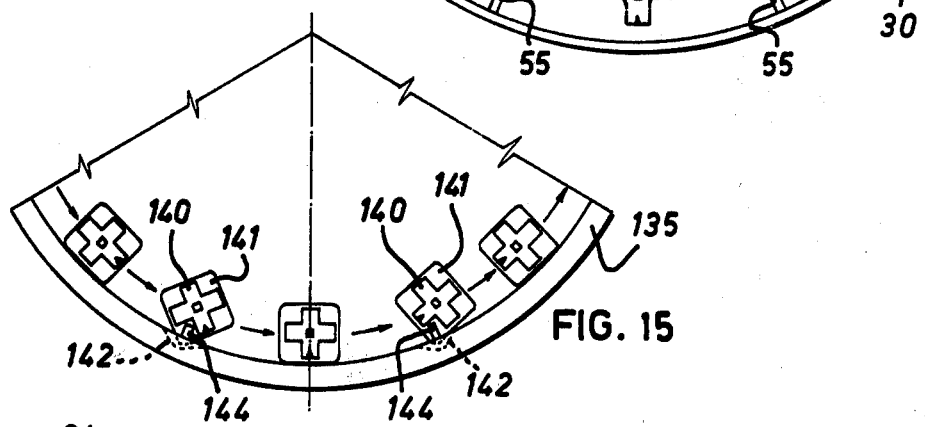
FIG. 15 is a diagrammatic plan view showing the different positions assumed by a cross, and the means proposed for its guiding, according to a different improved feature of the invention.
Figure 11:
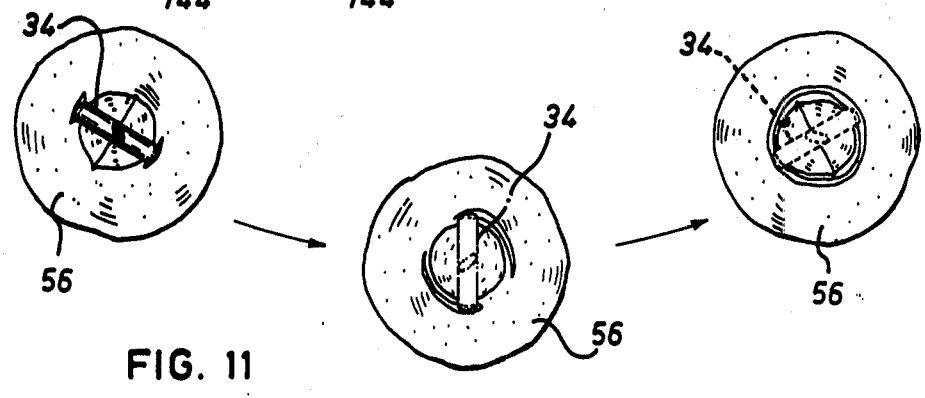
FIG. 11 is a plan view of the successive positions assumed by an upper destoning tool relative to the positions of the cross in FIG. 10.
Figure 16:
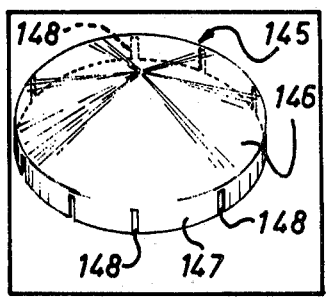
FIG. 16 is a perspective view of the inverted cup to be inserted into the central region of the fruit distribution station of FIG. 12.
Figure 14:
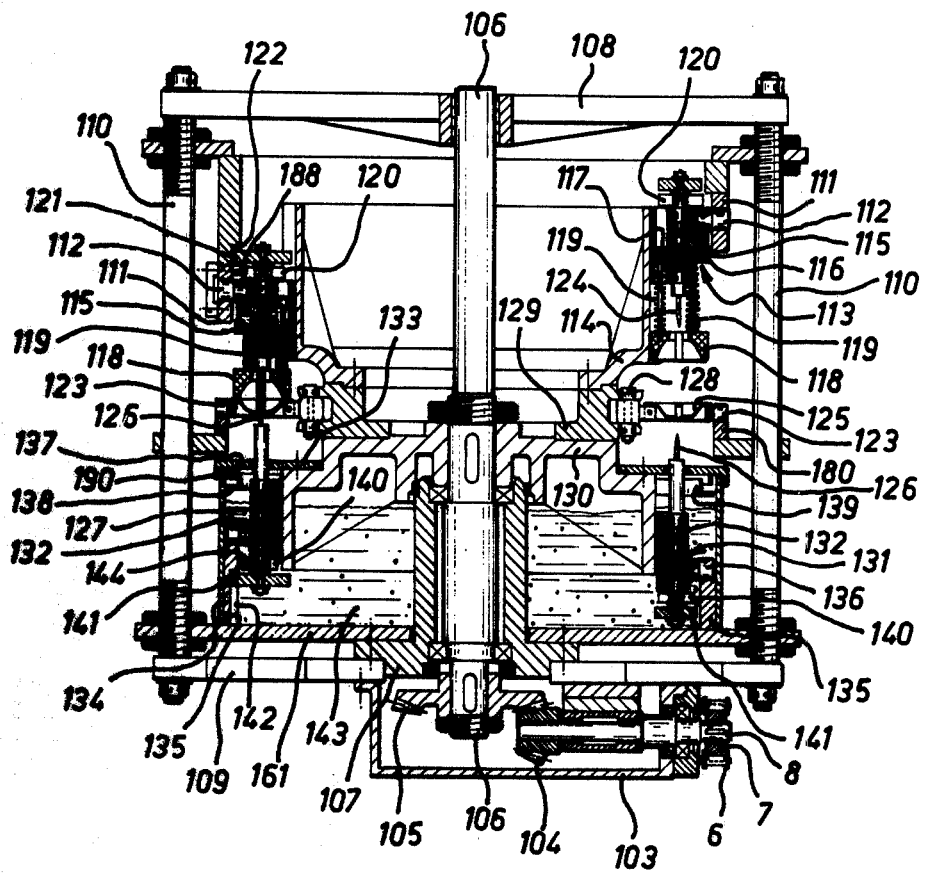
FIG. 14 is a longitudinal section through the fruit processing station, in an improved machine, on the line IV—IV of FIG. 3.

FIGS. 14, 15 and 16 show some improved parts of the machine according to different features of the invention. The particular features referred to are proposed to eliminate possible disadvantages, so as wear, distribution difficulties and uncorrect orientation of the destoning tools.

FIG. 14 of said figures shows a drive chain 6 wound about a sprocket wheel 7 keyed on to a horizontal spindle 8 which penetrates into a containing box 103 in which it is provided at its end with a bevel gear 104. This latter engages with the teeth of a second bevel gear 105 keyed on a vertical shaft 106 supported by a sleeve 107 disposed above the machine platform 109.

Said vertical shaft 106 extends upwards to reach a frame 108 which supports the upper end of said vertical shaft 106.

Two vertical columns 110 branch perpendicularly from the frame 108 and extend downwards to reach the platform 109 to which they are connected.

Substantially in the centre of the vertical shaft 106 there is keyed a lower cylindrical crown 130 on which is connected a double ring gear 129 over the teeth of which there is wound a chain 128 with half cups 125 hinged at equal distances apart to its links, and from the opposite ends of which branch idle rollers 123 which rest on a slide rail 180.

The base of said half cups 125 is provided with a through hole and a slot for the passage of the destoning tools.

To the upper face of the double ring gear 129 is connected an upper cylindrical crown 114, on the periphery of which there is disposed a plurality of upper mandrels 113 at equal distances apart in the radial direction at a pitch substantially equal to the distance between the axes of the half cups 125.

Said upper mandrels 113 consist essentially of a central member 115 in which, in the longitudinal or vertical direction, there is provided a plurality of holes into which are inserted a like number of vertical pins 117, the lower threaded end of each being screwed into a counter-cup 118.

On each of the said vertical pins 117 is mounted a compression spring 119, one end of which rests on the counter-cup 118 and the other end on a shoulder provided in the central member 115 of the mandrel 113. Said central member 115 is provided with a convenient prismatic slide which is housed and can slide in a corresponding prismatic guide provided on the outer cylindrical surface of the upper cylindrical crown 114.

The central member 115 is also traversed by a vertical spindle 116 lying between the plurality of vertical pins 117, its lower end supporting a destoning tool 124 which, during the working stage, can penetrate into the counter-cup 118.

To the side of said vertical spindle 116 and destoning tool 124, and coplanar with this latter, the said central member 115 supports two halving blades which are not shown for clarity and simplicity of drawing because they are of known type.

In the upper outer region of the central member 115 there is idly mounted a roller 112 which slides in a convenient guide lane 111 which branches from and is supported by the upper terminal part of the vertical columns 110.

On the upper end of the spindles 116 there is connected a cross 120 which, during the machine operation, comes into contact with a pair of strikers 118 which branch from the inner surface of the upper guide lane 111.

A square guide plate 121 is connected to the vertical spindle 116 above the cross 120, and is constituted by a convenient material, e.g. teflon, and is continuously guided by the inner cylindrical surface of the guide lane 111.

In said guide lane 111, notches 122 are provided at the strikers 188 for allowing said guide plate 121 to rotate when the cross 120 comes into contact with the striker 188. In the manner described for the upper cylindrical crown 114, on the lower cylindrical crown 130 there is also disposed a plurality of mandrels 131 aligned with the upper mandrels 113, the counter-cups 118 and the half cups 125.

Said mandrels 131, provided with a convenient slide for their relative sliding with respect to the lower cylindrical crown 130, are provided on the outer face of their central members 132 with an idle roller 136 which slides on the lower guide lane 135.

Said central member 132 is traversed by a vertical spindle 127, to the upper end of which is connected a lower destoning tool 126.

On the lower end of said vertical spindle 127 is keyed a cross 140 which, during machine operation, comes into contact with the strikers 144 which branch from the inner surface of the guide lane 135.

A substantially square guide plate 141 is keyed on the vertical shaft 127 below said cross 140, and is analogous to the guide plate 121 described for the upper mandrels 113.

In the same manner, at the strikers 144, a pair of notches 142 are provided on the inner wall of the guide lane 135 at the pair of strikers 144, to enable said guide plates 141 to rotate when the crosses 140 come into contact with the strikers 144.

A baseplate 161 branches from the lower terminal part of the vertical columns 110, and extends to reach the sleeve 107 where it is provided with convenient seal means.

A cylindrical wall 134 branches from said baseplate 161 to the side of the lower guide lane 135, for containing oil bath 143 provided for lubricating all the members constituting the lower mandrels 131.

Above a convenient shoulder on the lower cylindrical crown 130 there is connected an annular cover 133, from the outer edge of which branches a vertical circumferential rib 190 positioned externally to the upper edge of the cylindrical containing wall 134.

A circumferential containing gusset 137 branches on the inside of the cylindrical containing wall 134 and parallel to said circumferential rib 190, from the lower face of the annular cover 133.

A collection channel 139 of substantially L cross-section branches from the inner face of the upper end of the cylindrical wall 134, its vertical wall being internal to the containing gusset 137 with reference to the vertical shaft 106. The horizontal wall of the said collection channel 139 is provided with a plurality of through holes 138 distributed variously over said lower wall of the collection channel 139. The collection channel 139, or rather its lower horizontal wall, is at a suitable distance from the free surface of the oil bath 143.

A valve provided with a convenient level indicator is provided in the lower region of the cylindrical wall 134, although it is not shown for simplicity of drawing and is of known type. This valve is provided for draining any layer of water and juice which infiltrates into the interior of the oil bath 43.

With reference to FIGS. 12 and 16, the distributor of the fruit loading station comprises an inverted cup 145 disposed in the central region of the conical plate 75. Said inverted cup 145 consists essentially of a cylindrical surface 149 connected upperly to a conical surface 146, the inclination of which is greater than that of the bottom cone frustum wall of the container 70.

A plurality of slots 149 are provided on the vertical cylindrical wall 147 of the inverted cup 145, their distance apart and their width being equal respectively to the distance between the sheet metal gussets 78 and the thickness of said gussets.

The machine described operates in the following manner.

Only a partial description of the operation is given hereinafter, namely that referring particularly to the different features inlustred, as the complete operation has been described in detail. When the fruit is loaded into the central region of the cylindrical container 69 (FIG. 12), the conical surface 146 of the inverted cup 145 and the rotation of this latter cause the fruit to become disposed in alignments inside the radial channels 80 defined by the radial dividing elements 78.

When the last piece of fruit of the alignments inside the radial channels 80 reaches the slot 73, said piece of fruit falls into the underlying half 125 (FIG. 14), while the penultimate piece of fruit is retained by the vertical rib 76.

The fruit thus loaded into the half cups 125 is positioned automatically inside these latter downstream of the loading station, and then reaches the processing station shown in FIG. 14.

During the rotation of said processing station, see FIG. 15, one side of the upper guide plate 121 and lower guide plate 141 slides continuously on the inner cylindrical surface of the upper guide lane 111 and lower guide lane 135 respectively, so that the destoning tools 124 and 126 are constantly positioned relative to the counter-cups 118 and half cups 125.

With reference to FIG. 15, when a corresponding pair of upper and lower mandrels 113, 116 approach each other, with consequent penetration of the destoning tools 124 and 126 into the counter-cup 118 and half cup 125, the guide lanes 111 and 135 remain horizontal and parallel to each other over a certain distance.

A detailed description will now be given of the operations taking place only with reference to the lower guide lane 135, as the operations taking place in the upper guide lane 111 are the same.

In the raised position, the lower mandrel 131 continues to move and the destoning tool 126 remains at rest inside the half cup 125, as the guide plate 141 is in continuous contact by way of one of its sides with the inner cylindrical wall of the guide lane 135.

When the mandrel 131 reaches the striker 144, the cross 140 collides by one of its teeth with the said striker 144 to drag with it the vertical spindle 127, the destoning tool 126 and the guide plate 141.

Said guide plate 141 can rotate a certain amount under the striker 144.

In the thickness of the guide lane 135 there is provided a notch 142 which enables the corner of the guide plate 141 to penetrate therein.

As soon as the tooth which has collided with the striker 144 has passed beyond this latter, the notch 142 terminates, and the side following the previous side of the guide plate 141 rests against the inner cylindrical surface of the guide lane 135. In this manner the cross 140 and thus the vertical spindle 127 have made a rotation of 90°, and remain in said position determined by the second side which is now in contact with the cylindrical surface of the lane 135.

Said position is maintained until the next tooth of the cross collides with the second striker 144 to cause a further rotation of 90° of the guide plate 141, which is able to rotate as a second notch 142 is provided in proximity to the second striker 144.

In this case, the cross also makes only a rotation of 90°, after which, when the corner of the guide plate 141 emerges from the notch 142, the vertical spindle 127 is kept in the position which it has just assumed, by a further side of the guide plate 141.

As the destoning tools 126 and 124 are provided with two opposing curved blades, the 180° rotation of said tools enables the central part of the pulp of the fruit to be completely removed.

Thus when the guide plates 141 have rotated through 180°, they keep the lower and upper destoning tools always in the same position as one of their sides is in continuous contact with the inner cylindrical surface of the guide lane 135, and this remains so until the corresponding crosses come into contact with the upper striker 188 and lower striker 144.

By slight modifications and suitable adjustment, the machine according to the invention in addition to processing peaches or apples could easily process apricote, plums or the like.

The invention is not limited to the embodiments heretofore described, and variations and improvements may be made to it without leaving the scope of the invention, the fundamental characteristics of which are summarised in the following claims.

What we claim is:

1. A continuous cycle destoning and halving machine, particularly for peaches, apples and similar fruit, comprising a continuously moving endless conveyor belt extending around two ring gears rotating on spaced vertical axes, one being a drive gear and the other a driven gear, the conveyor belt supporting a row of half cups, said conveyor belt comprising a chain, to each link of which there is externally hinged for pivotal movement about a horizontal axis, a half cup for containing fruit, an idler roller mounted on said half cup opposite said hinge of each cup and which slides on a continuous substantially horizontal rail extending around and supported by the machine frame externally of and substantially parallel to the chain, there being provided at points along said conveyor belt an atuomatic station above one of the ring gears for loading the fruit on to the conveyor belt, a fruit positioning station disposed downstream of said automatic loading station, a fruit processing station in proximity to the other of said ring gears and a discharge station for the processed fruit disposed downstream of said processing station, and wherein said rail includes a vertically downwardly displaced portion adjacent said discharge station to permit each said half cup to pivot downwardly about its hinge to thereby discharge the respective fruit therefrom.

2. A machine as claimed in claim 1, in which said drive gear and driven gear are double ring gears.

3. A machine as claimed in claim 1, wherein the station for positioning the fruit in the half cups of the conveyor belt consists essentially of a chain wound as an endless ring between two opposing pairs of ring gears of horizontal axis and driven at the same speed as the overlying conveyor belt, from which the cups derive, the upper portion of said chain being parallel to said conveyor downstream of the automatic fruit loading station, on the links of said chain there being idly disposed pins which are provided at the outer extremities of the chain with shaped punches which slightly penetrate into the half cups, while at the other ends, i.e. on the inside of the chain, they are provided with sprocket wheels which engage over the upper portion of the chain in a rack supported by the machine frame.

4. A machine as claimed in claim 3, wherein the top of said shaped punches becomes inserted in the corresponding half cups when these latter are on the upper portion of the chain, said punches having the same pitch as said half cups.

5. A machine as claimed in claim 1, wherein the fruit processing station consists essentially of a lower cylindrical crown and an upper cylindrical crown which move rigidly with the driven ring gear and on the peripheries of which are disposed mandrels which are each coaxial with the axes of the half cups which lie between them, the mandrels sliding vertically relative to said cylindrical crowns by means of rollers idly disposed on said mandrels and which engage in two guides supported by the machine frame, and which in plan view are configured as a circumference.

6. A machine as claimed in claim 5, wherein in the frontal region of said processing station the two said guides approach each other over a certain distance, the upper guide slightly anticipating the lower guide, so as to enable a counter-cup disposed on the upper mandrel by elastic supports to rest on the half cup, while two halving blades and a stone removal tool lying between said two blades penetrate from above into the fruit through said counter-cup, there being provided a second stone removal tool which penetrates into the fruit from below through the half cup.

7. A machine as claimed in claim 5, wherein the upper and lower stone removal tools are individually connected to spindles idly mounted on the mandrels, and to the upper end of said spindle of the upper mandrel and to the lower end of said spindle of the lower mandrel are keyed crosses which, during the movement of the mandrels collide with a lower and an upper pair of teeth, branching from the inner surfaces of said guides in positions corresponding with the two approaching portions of said guides.

8. A machine as claimed in claim 5, wherein a strip is connected to the lower cylindrical crown, the outer substantially vertical edge of the strip being inserted into an annular channel for collecting juice, any pieces of fruit pulp and the water deriving from the overlying conveyor belt and said duct.

9. A machine as claimed in claim 5, wherein in the lower region of the processing station there is provided a lubrication casing or chamber essentially constituted by a fixed cylindrical wall branching from a baseplate and extending upwards to embrace externally the mandrel guide and reach an annular cover which moves in synchronism with the mandrels, from the lower face of its outer edge there branching a circumferential rib and a circumferential containing gusset which are external and internal respectively to the upper edge of said cylindrical wall; from the inner face of said upper edge there branching a circumferential collection channel substantially of L cross-section, its vertical wall being internal to said containing gusset while its horizontal wall is provided with a plurality of through holes and is located at a certain distance from the free surface of the oil bath of said lubrication casing or chamber.

10. A machine as claimed in claim 5, wherein a drain valve provided with a normal level indicator is provided on the baseplate of said lubrication chamber, for draining any water and juice layer which penetrates into the oil bath.

11. A machine as claimed in claim 8, wherein the guide and positioning means with which each lower and upper destoning tool is provided are essentially constituted by a square plate of convenient material, keyed to the support spindle for the tool, and with one of its sides in continuous contact, during the non-working stages of the tool, with the inner surface of the mandrel guide lane on which, in convenient positions, are provided notches into which the corners of said plate become located during the working stages of the tool.

12. A machine as claimed in claim 1, wherein the discharge station disposed downstream of the processing station consists essentially of a downward incline towards the centre of the machine, of the rail on which the idle rollers of the conveyor belt half cups slide, so that when said half cups reach said discharge station they become substantially vertical to discharge the processed fruit contained therein and then take a horizontal path immediately afterwards.

13. A continuous cycle destoning and halving machine, particularly for peaches, apples and similar fruit, comprising a continuously moving endless conveyor belt extending around two ring gears rotating on spaced vertical axes, one being a drive gear and the other a driven gear, the conveyor belt supporting a row of half cups, said conveyor belt comprising a chain, to each link of which there is connected a half cup for containing fruit, an idle roller on each half cup which slides on a continuing horizontal rail extending around and supported by the machine frame outwardly of and parallel to the chain, there being provided at points along said conveyor belt an automatic loading station above one of the ring gears for loading the fruit onto the conveyor belt, a fruit positioning station disposed downstream of said automatic loading station, a fruit processing station in proximity to the other of said ring gears and a discharge station for the processed fruit disposed downstream of said processing station, said automatic loading station comprising; a container including a fixed annular duct having an outwardly sloping bottom wall, an upper wall, an outer wall, an inner generally vertical wall, said inner wall extending along a portion of said outer wall, a group of radial dividing elements driven in synchronism with said conveyor and defining a plurality of generally radial channels which distribute fruit to said duct in radial lines and drag the fruit circumferentially along said duct, one of said duct walls including a single opening through which the outermost piece of fruit of a line is singly discharged onto an underlying aligned half cup of the conveyor.

14. A machine as claimed in claim 13, wherein a lower base of the radial channels of the dividing elements comprises a radial wall extending to a location adjacent said inner wall of the duct.

15. A machine as claimed in claim 13, wherein the dividing elements extend as far as the outer wall of the duct, said elements having apertures for the passage of the inner wall of the duct.

16. A machine as claimed in claim 13, wherein an inverted cup shaped member comprising a peripheral cylindrical wall connected to an inwardly and upwardly sloping conical wall is located in the central region of the dividing elements of the loading station, said cylindrical wall having a plurality of radial slots which have a pitch, width, and height essentially the same as said radial dividing elements.

* * * * *